United States Patent
Yano

(10) Patent No.: US 11,878,687 B2
(45) Date of Patent: Jan. 23, 2024

(54) AUTOMATED DRIVING METHOD FOR VEHICLE AND AUTOMATIC CONTROL APPARATUS

(71) Applicant: NISSAN MOTOR CO., LTD., Yokohama (JP)

(72) Inventor: Hirofumi Yano, Kanagawa (JP)

(73) Assignee: NISSAN MOTOR CO., LTD., Yokohama (JP)

(*) Notice: Subject to any disclaimer, the term of this patent is extended or adjusted under 35 U.S.C. 154(b) by 645 days.

(21) Appl. No.: 16/964,018

(22) PCT Filed: Jan. 24, 2018

(86) PCT No.: PCT/JP2018/002109
§ 371 (c)(1),
(2) Date: Jul. 22, 2020

(87) PCT Pub. No.: WO2019/146013
PCT Pub. Date: Aug. 1, 2019

(65) Prior Publication Data
US 2021/0031768 A1 Feb. 4, 2021

(51) Int. Cl.
*B60W 30/16* (2020.01)
*B60W 60/00* (2020.01)
*B60W 10/06* (2006.01)
*B60W 40/04* (2006.01)

(52) U.S. Cl.
CPC .......... *B60W 30/162* (2013.01); *B60W 10/06* (2013.01); *B60W 40/04* (2013.01); *B60W 60/0023* (2020.02); *B60W 2556/45* (2020.02); *B60W 2710/06* (2013.01); *B60W 2720/106* (2013.01)

(58) Field of Classification Search
None
See application file for complete search history.

(56) References Cited

U.S. PATENT DOCUMENTS

| | | | |
|---|---|---|---|
| 9,169,922 B1 * | 10/2015 | Remes | B60W 30/17 |
| 9,953,527 B1 * | 4/2018 | Alhazmi | E01C 1/02 |
| 2007/0282530 A1 * | 12/2007 | Meister | G08G 1/165 |
| | | | 340/686.6 |

(Continued)

FOREIGN PATENT DOCUMENTS

| DE | 10 2005 050 277 A1 | 4/2007 |
|---|---|---|
| JP | 2867552 * | 3/1999 |

(Continued)

OTHER PUBLICATIONS

Machine translation of JP2867552 (Year: 1999).*

Primary Examiner — Christian Chace
Assistant Examiner — Scott R Jagolinzer
(74) Attorney, Agent, or Firm — Foley & Lardner LLP

(57) ABSTRACT

An automated driving method for a vehicle includes: determining whether or not a traffic jam is detected ahead of a host vehicle by a distance equal to or more than a predetermined distance on a travel route of the host vehicle during travel by automated driving that brings a vehicle speed close to a target vehicle speed; and in a traffic jam detection time when the traffic jam is detected, reducing the vehicle speed VSP to be lower than a target vehicle speed VSPt0 for the automated driving in a normal time other than the traffic jam detection time.

10 Claims, 7 Drawing Sheets

(56) References Cited

U.S. PATENT DOCUMENTS

| | | |
|---|---|---|
| 2009/0299598 A1 | 12/2009 | Boecker et al. |
| 2011/0054768 A1* | 3/2011 | Sullivan ................ B60W 10/06 |
| | | 701/123 |
| 2012/0226433 A1 | 9/2012 | Hasan et al. |
| 2013/0116909 A1 | 5/2013 | Shida |
| 2014/0244129 A1 | 8/2014 | Filev et al. |
| 2016/0247397 A1* | 8/2016 | Xu ....................... G08G 1/0125 |
| 2017/0043776 A1* | 2/2017 | Sujan ................. B60W 30/188 |
| 2017/0120890 A1* | 5/2017 | Payne .............. G08G 1/096833 |
| 2017/0261991 A1* | 9/2017 | Raghu .................. B60W 30/00 |
| 2018/0057001 A1* | 3/2018 | Hu ................. B60W 30/18072 |
| 2019/0071067 A1* | 3/2019 | Leone ................ F02N 11/0837 |

FOREIGN PATENT DOCUMENTS

| | | |
|---|---|---|
| JP | 2008-269357 A | 11/2008 |
| JP | 2011-68308 A | 4/2011 |
| JP | 2012-30665 A | 2/2012 |
| JP | 2016-207073 A | 12/2016 |

\* cited by examiner

AUTOMATED DRIVING METHOD FOR VEHICLE AND AUTOMATIC CONTROL APPARATUS

TECHNICAL FIELD

The present invention relates to an automated driving method for a vehicle and an automatic control apparatus each for changing a control mode for automated driving at the time when a traffic jam is detected.

BACKGROUND ART

As a technology to perform, when a traffic jam is detected, automated driving by a control mode different from a control mode used in a normal time, JP 2011-068308 describes the following technology. After a traffic jam is detected, when a host vehicle comes close to a line (hereinafter referred to as a "traffic jam line" in some cases) of vehicles forming the traffic jam and an in-vehicle sensor recognizes a vehicle positioned at the end of the traffic jam line, a control for traffic jam travel is started. More specifically, a position of a leading vehicle ahead of the host vehicle to a top position of the traffic jam line ahead is detected, and the behavior of the leading vehicle is predicted from the position of the leading vehicle. Then, based on a prediction result, following travel of the host vehicle to follow the leading vehicle is controlled (paragraphs 0035 to 0038).

SUMMARY OF INVENTION

The technology described in the above document relates to following travel after the host vehicle recognizes a vehicle positioned at the end of a traffic jam line, substantially, after the host vehicle reaches the end of the traffic jam. That is, the above technology is intended to improve fuel efficiency when the host vehicle is in a traffic jam line and does not have any influence on a period before the host vehicle reaches the end of a traffic jam after the traffic jam is detected, in other words, a period before the host vehicle joins the traffic jam line. Accordingly, there is such a possibility that, even though a traffic jam is present ahead of the host vehicle, the host vehicle might perform unnecessary acceleration and deceleration due to travel in accordance with behaviors of neighboring vehicles until the host vehicle reaches the end of the traffic jam, and it may be said that there is room for improvement to further improve fuel efficiency.

An object of the present invention is to provide an automated driving method for a vehicle and an automatic control apparatus in consideration of the above problems.

An automated driving method for a vehicle according to one embodiment of the present invention is provided as an automated driving method for a vehicle, the automated driving method comprising: determining whether or not a traffic jam is detected ahead of a host vehicle by a distance equal to or more than a predetermined distance on a travel route of the host vehicle during travel by automated driving that brings a vehicle speed close to a target vehicle speed; and in a traffic jam detection time when the traffic jam is detected, reducing the vehicle speed to be lower than a target vehicle speed for the automated driving in a normal time other than the traffic jam detection time.

According to other embodiment of the present invention, an automatic control apparatus for a vehicle is provided.

DESCRIPTION OF EMBODIMENTS

With reference to drawings, the following describes an embodiment of the present invention.

(Overall Configuration of System)

Figure 1:
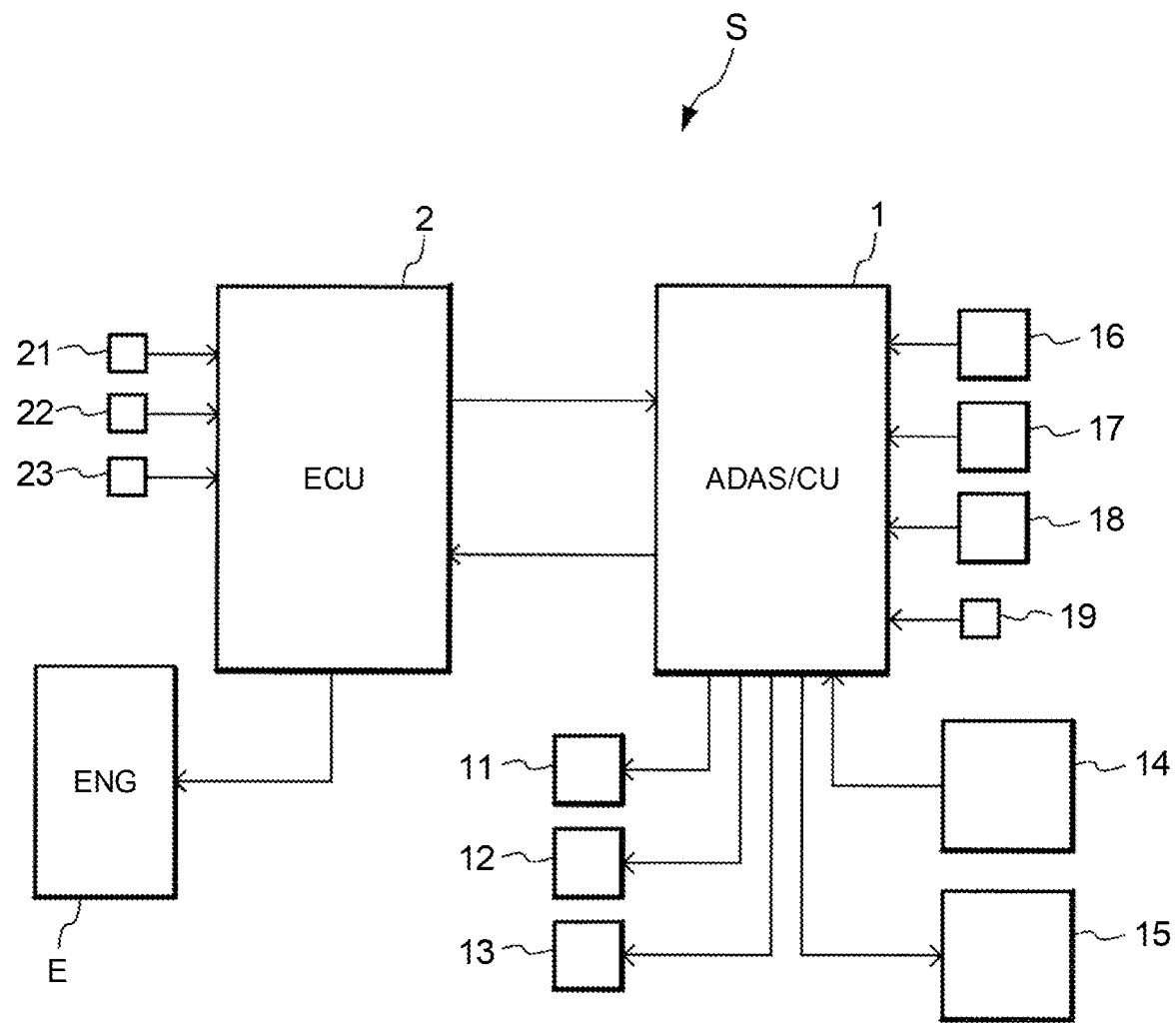
FIG. 1 is a schematic view illustrating an overall configuration of a control system for a self-driving vehicle according to one embodiment of the present invention.

FIG. 1 is a schematic view illustrating an overall configuration of a control system (hereinafter referred to as a "vehicle control system") S for a self-driving vehicle according to one embodiment of the present invention.

The vehicle control system S includes an internal combustion engine (hereinafter just referred to as an "engine") E that is a drive source of the vehicle, a driving support system controller (ADAS/CU) 1, and an engine controller (ECU) 2.

The engine controller 2 is configured to control an operation of the engine E. The engine controller 2 controls an output of the engine E by adjusting an intake-air amount, a fuel supply amount, and so on to the engine E. The engine controller 2 is connected to the driving support system controller 1 in a mutually communicable manner and receives, as information related to an engine control, a signal from an accelerator sensor 21 for detecting an operation amount of an accelerator pedal by a driver, a signal from a rotation speed sensor 22 for detecting a rotation speed of the engine E, a signal from a water temperature sensor 23 for detecting a coolant temperature of the engine E, and so on.

The driving support system controller 1 sets various control parameters for automated driving of the vehicle and outputs command signals to various devices (e.g., the engine E) related to automated driving. In the present embodiment, the "automated driving" indicates a driving state where, in a state where a driver can take back manual driving anytime when the driver selects, all operations of acceleration, braking, and steering are conducted by the control system side while the driver monitors the operations. However, an automation type or an automated driving level to which the present embodiment is applicable is not limited to this. In the present embodiment, a vehicle speed is controlled by automated driving such that the vehicle speed is brought close to a target vehicle speed, and an acceleration or a deceleration of the vehicle that is set when the vehicle speed is controlled corresponds to the "control parameter" for automated driving.

The vehicle control system S includes, as devices related to the automated driving of the vehicle, an automatic steering device 11, an automatic wheel brake device 12, and an automatic parking brake device 13 in addition to the engine E. The automatic steering device 11, the automatic wheel brake device 12, and the automatic parking brake device 13 are all operable in response to command signals from the driving support system controller 1. The automatic steering device 11 is a device for changing an advancing direction and a backward direction of the vehicle during automated driving, the automatic wheel brake device 12 is a device for generating a braking force in the vehicle without depending on an operation on a brake pedal by a driver, and the automatic parking brake device 13 is a device for automatically actuating a parking brake when a system activation switch of the vehicle is turned off.

Further, the vehicle control system S includes a switching device 14 for switching between automated driving and manual driving based on selection by a driver and setting driving conditions during automated driving, and a display device 15 for causing the driver to recognize an operational state of the automated driving and a travel state of the vehicle. In the present embodiment, the switching device 14 is configured as a consolidation switch (hereinafter referred to as a "handle switch") provided adjacent to a gripping portion of a steering wheel and includes an operation portion for switching between ON and OFF of the automated driving and for switching a setting vehicle speed and a setting vehicle-to-vehicle distance. The display device (hereinafter referred to as a "meter display") 15 is provided on a dashboard of a driver seat and is a configuration to enable visual recognition of an ON or OFF state of the automated driving (e.g., by using different display colors for the ON state and the OFF state of the automated driving). The display device 15 includes a display portion on which a setting vehicle speed and a setting vehicle-to-vehicle distance are displayed.

In the present embodiment, the driving support system controller 1 and the engine controller 2 are each configured as an electronic control unit including a microcomputer constituted by a central processing unit (CPU), various storage devices such as a ROM and a RAM, an input-output interface, and so on.

The driving support system controller 1 receives, as information related to the automated driving, a signal from the handle switch 14, a signal from a leading vehicle detection device 16, and a signal from a vehicle-to-vehicle distance measuring device 17. The leading vehicle detection device 16 detects the presence of a leading vehicle in a range within a predetermined distance ahead of a host vehicle and can be embodied by an optical camera sensor, for example. The vehicle-to-vehicle distance measuring device 17 detects a vehicle-to-vehicle distance between the host vehicle and the leading vehicle and can be embodied by a radar sensor, e.g., a millimeter wave radar sensor. The driving support system controller 1 detects a relative speed of the leading vehicle to the host vehicle based on a signal from the vehicle-to-vehicle distance measuring device 17, more specifically, a change amount per unit time in a vehicle-to-vehicle distance. The leading vehicle detection device 16 and the vehicle-to-vehicle distance measuring device 17 can be configured as one sensor unit, and a radar sensor or the like may be configured to double as the leading vehicle detection device 16 and the vehicle-to-vehicle distance measuring device 17.

The driving support system controller 1 further receives, as the information related to the automated driving, a signal from a road traffic information receiving device 18. The road traffic information receiving device 18 receives road traffic information such as VICS (registered trademark) (Vehicle Information and Communication System) information from a base station outside the vehicle and can be embodied by a car navigation system, for example. In the present embodiment, the road traffic information receiving device 18 is used for acquisition of information about a traffic jam and can be replaced with a VICS information receiving terminal, a vehicle-to-vehicle communication information receiving terminal, or a road-to-vehicle communication information receiving terminal. An example of the road-to-vehicle communication information receiving terminal can be a receiving terminal for a wireless transmission device such as a beacon. The road traffic information receiving device 18 is not limited to an installed-type device in the vehicle and may be a portable terminal such as a mobile phone that can provide traffic jam information to the driving support system controller 1.

In addition to the above, the driving support system controller 1 receives a signal from a vehicle speed sensor 19 for detecting a vehicle speed VSP. The signal indicative of the vehicle speed VSP can be received via the engine controller 2.

(Operation of Control System)

When automated driving is selected by an operation of the handle switch 14, the vehicle control system S sets a requested acceleration and a requested deceleration demanded for the host vehicle based on a travel state of the host vehicle, a travel state of a vehicle (e.g., a leading vehicle) other than the host vehicle, a neighboring traffic condition, and so on. The driving support system controller 1 sets a requested driving force, for the vehicle, that is required to achieve the requested acceleration and outputs, to the engine controller 2, a command signal to cause the engine E to generate an output torque corresponding to the requested driving force. The driving support system controller 1 further sets a requested braking force, for the vehicle, that is required to achieve the requested deceleration and outputs, to the automatic wheel brake device 12, a command signal corresponding to the requested braking force.

In the present embodiment, the driving support system controller 1 takes, as a speed limit, a maximum speed specified by a road sign or determined by laws and the like, and the driving support system controller 1 selects a lower vehicle speed from a vehicle speed (hereinafter referred to as a "setting vehicle speed" in some cases) set by a driver and the speed limit and sets the selected vehicle speed as a target vehicle speed. The driving support system controller 1 then sets a requested driving force so as to bring the vehicle speed close to the target vehicle speed at a requested acceleration corresponding to a current vehicle speed of the host vehicle and outputs a command signal to the engine controller 2. Hereby, the vehicle basically performs constant-speed travel at the target vehicle speed.

Further, in a case where following travel is performed such that the host vehicle travels while a predetermined vehicle-to-vehicle distance to the leading vehicle ahead of the host vehicle is maintained, the driving support system controller 1 sets a requested driving force and a requested braking force so that a relative speed of the leading vehicle to the host vehicle (in other words, a relative speed of the host vehicle to the leading vehicle) is zero at a vehicle-to-vehicle distance (hereinafter referred to as a "setting vehicle-to-vehicle distance" in some cases) set in advance or set by the driver. That is, the target vehicle speed during following travel depends on the vehicle speed of the leading vehicle and is a vehicle speed in a state where the predetermined vehicle-to-vehicle distance is maintained.

The mode described above is a control mode for automated driving executed in a normal time.

The automated driving is cancelled when the handle switch 14 is operated by the driver or a given operation related to vehicle behavior (e.g., the brake pedal is stepped on) is performed.

Here, in the present embodiment, during travel by automated driving, it is determined whether or not a traffic jam is detected on a travel route from a current location to a destination, the travel route being set in the car navigation system. When a traffic jam is detected ahead of the host vehicle by a distance equal to or more than a predetermined distance, the control mode for automated driving is changed from the mode in the normal time to a low fuel consumption mode at the time of detection of a traffic jam. Here, the "traffic jam" indicates a traffic condition in which an average vehicle speed of a plurality of vehicles decreases to a vehicle speed equal to or less than 40% of the speed limit due to congestion of the vehicles, for example. A position at the end of a range on a road in which the traffic jam occurs is referred to as a "traffic jam end." The "low fuel consumption mode" is a control mode in which fuel consumption before the vehicle reaches a traffic jam end from a current location where a traffic jam is detected is restrained in comparison with a case where the control mode in the normal time is continued even after the detection of the traffic jam. In the present embodiment, the low fuel consumption mode is performed as a control mode in which the vehicle speed controlled by automated driving is decreased to be lower than the target vehicle speed in the normal time.

(Description Based on Flowchart)

Figure 2:
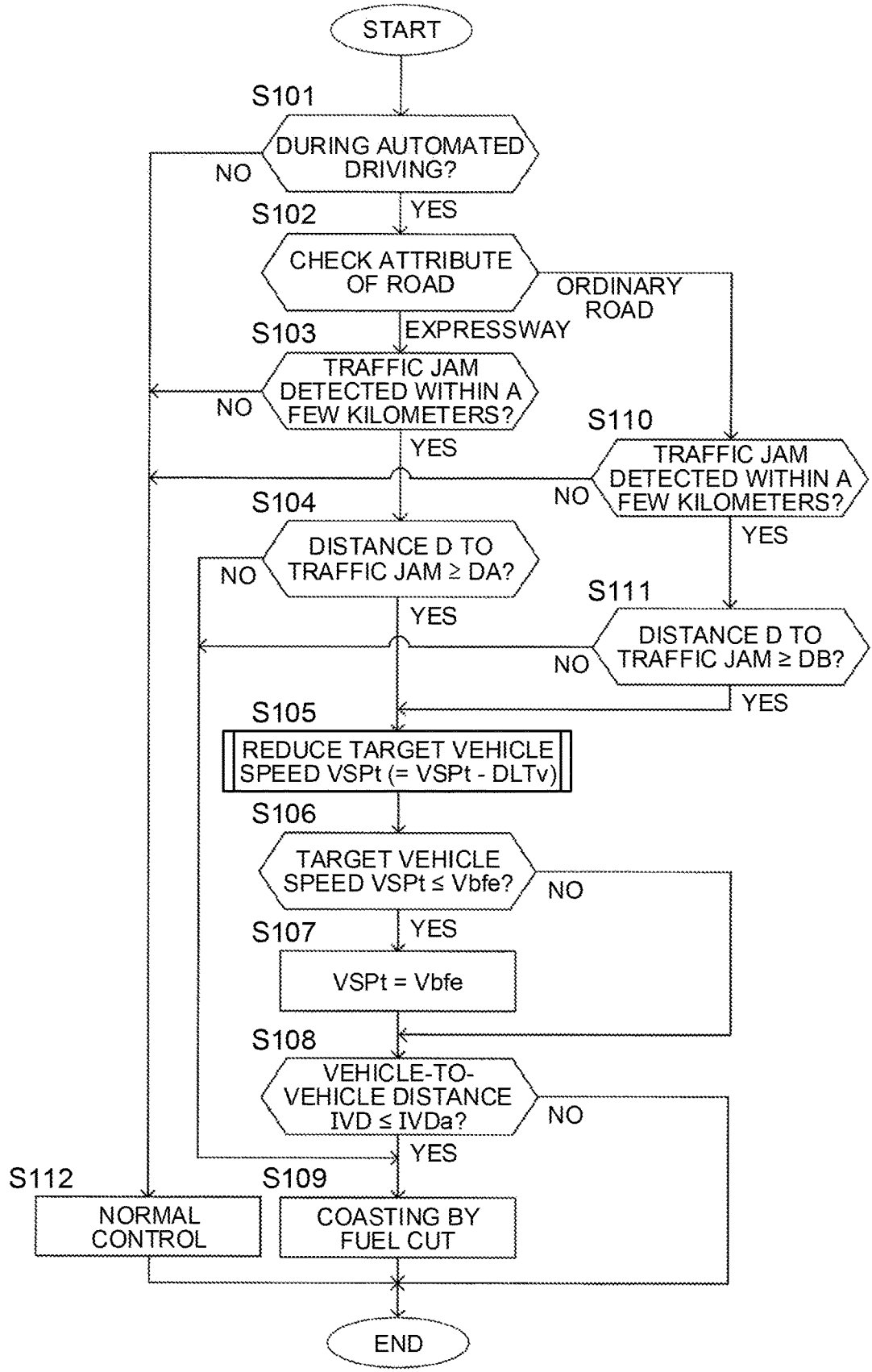
FIG. 2 is a flowchart illustrating a basic procedure of a control mode switching routine to be executed by the control system in the embodiment.

FIG. 2 illustrates, by a flowchart, a basic procedure of a control mode switching routine to be executed by the driving support system controller 1 for automated driving in the present embodiment. The driving support system controller 1 is programed to execute the control mode switching routine every predetermined time.

In the flowchart illustrated in FIG. 2, in S101, whether automated driving is being performed or not is determined. Whether automated driving is being performed or not can be determined based on a signal from the handle switch 14. When automated driving is being performed, the routine proceeds to S102, and when automated driving is not being performed, the routine proceeds to S112.

In S102, the attribute of a road where the host vehicle is traveling is checked. In the present embodiment, whether the road where the host vehicle is currently traveling is an expressway or an ordinary road is determined. When the road is an expressway, the routine proceeds to S103, and when the road is an ordinary road, the routine proceeds to S110. The speed limit in the expressway (e.g., 100 km per hour) is generally high in comparison with the speed limit in the ordinary road (e.g., 60 km per hour), and the target vehicle speed tends to be set to a higher speed. In view of this, it is considered that the vehicle speed controlled such that the vehicle speed is brought close to the target vehicle speed is higher in the expressway than in the ordinary road.

In S103, whether or not a traffic jam is detected within a predetermined range (e.g., a range of a few kilometers from the host vehicle) ahead of the host vehicle is determined. Whether a traffic jam is detected or not can be determined based on a signal from the road traffic information receiving device 18 embodied by a car navigation system. For example, the car navigation system detects a traffic jam ahead of the host vehicle based on road map information, traffic jam information, and position information about a current location of the host vehicle and transmits, to the driving support system controller 1, a signal indicating that the traffic jam is detected. In the present embodiment, whether a traffic jam is detected or not is determined based on whether or not a traffic jam end is within a predetermined range ahead of the host vehicle. When a traffic jam is detected, the routine proceeds to S104, and when a traffic jam is not detected, the routine proceeds to S112. The process of S103 is to take into consideration a time during which the vehicle is forced to travel at a relatively low speed until the vehicle reaches the traffic jam end after the traffic jam is detected. In the present embodiment, a traffic jam within 2 km ahead of the host vehicle is detected.

In S104, whether or not the traffic jam (more specifically, its end) detected in S103 is ahead of the host vehicle by a distance equal to or more than a predetermined distance DA is determined. The predetermined distance DA is a distance longer than a vehicle-to-vehicle distance (the setting vehicle-to-vehicle distance) from the leading vehicle, the vehicle-to-vehicle distance being set at the time of following travel. In the present embodiment, the predetermined distance DA is a distance longer than a detectable distance by the leading vehicle detection device 16 embodied by an optical camera sensor. When the traffic jam is ahead of the host vehicle by a distance equal to or more than the predetermined distance DA (e.g., 500 m), the routine proceeds to S105, and automated driving is performed in the low fuel consumption mode by processes of S105 to 109. Meanwhile, when a distance between the traffic jam and the host vehicle is less than the predetermined distance DA, the routine proceeds to S109 without executing the processes of steps S105 to 108.

In S105, a process to reduce the vehicle speed VSP to be lower than a target vehicle speed VSPt (=VSPt0) for the normal time is performed. In the present embodiment, the target vehicle speed VSPt is changed to a vehicle speed lower than the target vehicle speed VSPt0 set in the normal time. More specifically, after the traffic jam is detected, the target vehicle speed VSPt is reduced by a predetermined speed DLTv every time when the host vehicle advances only by a predetermined distance or a unit distance.

$$VSPt = VSPt - DLTv \qquad (1)$$

In S106, whether or not the target vehicle speed VSPt after the reduction is equal to or less than an optimum fuel consumption vehicle speed Vbfe is determined. In the present embodiment, the optimum fuel consumption vehicle speed Vbfe indicates a vehicle speed at which a fuel consumption amount per travel distance under road-road conditions is smallest. The optimum fuel consumption vehicle speed Vbfe varies depending on a type or the like of the vehicle or the engine E, but the optimum fuel consumption vehicle speed Vbfe can be grasped in advance through experiment or the like. When the target vehicle speed VSPt is equal to or less than the optimum fuel consumption vehicle speed Vbfe (e.g., 50 km per hour), the process proceeds to S107, and when the target vehicle speed VSPt is higher than the optimum fuel consumption vehicle speed Vbfe, the process proceeds to S108.

In S107, the target vehicle speed VSPt is set to the optimum fuel consumption vehicle speed Vbfe.

In S108, whether or not a vehicle-to-vehicle distance IVD from the leading vehicle is equal to or less than a predetermined distance IVDa is determined. When the vehicle-to-vehicle distance IVD is equal to or less than the predetermined distance IVDa, in other words, after the traffic jam is detected, when the host vehicle is coming close to the traffic jam and approaches a vehicle (the leading vehicle) positioned at the end of the traffic jam line within a distance equal to or less than the predetermined distance IVDa, the routine proceeds to S109, and when the host vehicle has not approached yet the vehicle positioned at the end of the traffic jam line within the predetermined distance IVDa, the control at this time is ended.

In S109, a signal to stop fuel supply to the engine E is output to the engine controller 2, and coasting is performed at the target vehicle speed VSPt after the reduction or at the optimum fuel consumption vehicle speed Vbfe.

In S110, whether or not a traffic jam is detected within a predetermined range ahead of the host vehicle is determined. The predetermined distance used for the comparison in S110 is a distance shorter than the predetermined distance (e.g., 2 km) used in S103 and is for example, 1 km. When a traffic jam is detected within 1 km ahead of the host vehicle, the routine proceeds to S111, and when a traffic jam is not detected, the routine proceeds to S112. Similarly to the process of S103, the process of S110 is to take into consideration a time during which the vehicle is forced to travel at a relatively low speed until the vehicle reaches the traffic jam end after the traffic jam is detected.

In S111, whether or not the traffic jam (more specifically, its end) detected in S110 is ahead of the host vehicle by a distance equal to or more than a predetermined distance DB is determined. Similarly to the predetermined distance DA, the predetermined distance DB is a distance longer than a detectable distance by the leading vehicle detection device 16 embodied by an optical camera sensor, but the predetermined distance DB is set to a distance shorter than the predetermined distance DA. When the traffic jam is ahead of the host vehicle by a distance equal to or more than the predetermined distance DB (e.g., 350 m), the routine proceeds to S105, and automated driving is performed in the low fuel consumption mode by the processes of S105 to 109. Meanwhile, in a case where a distance between the traffic jam and the host vehicle is less than the predetermined distance DB, the routine proceeds to S109 without executing the processes of steps S105 to 108.

In S112, automated driving is performed in the control mode for the normal time.

(Description About Operation)

Figure 3:
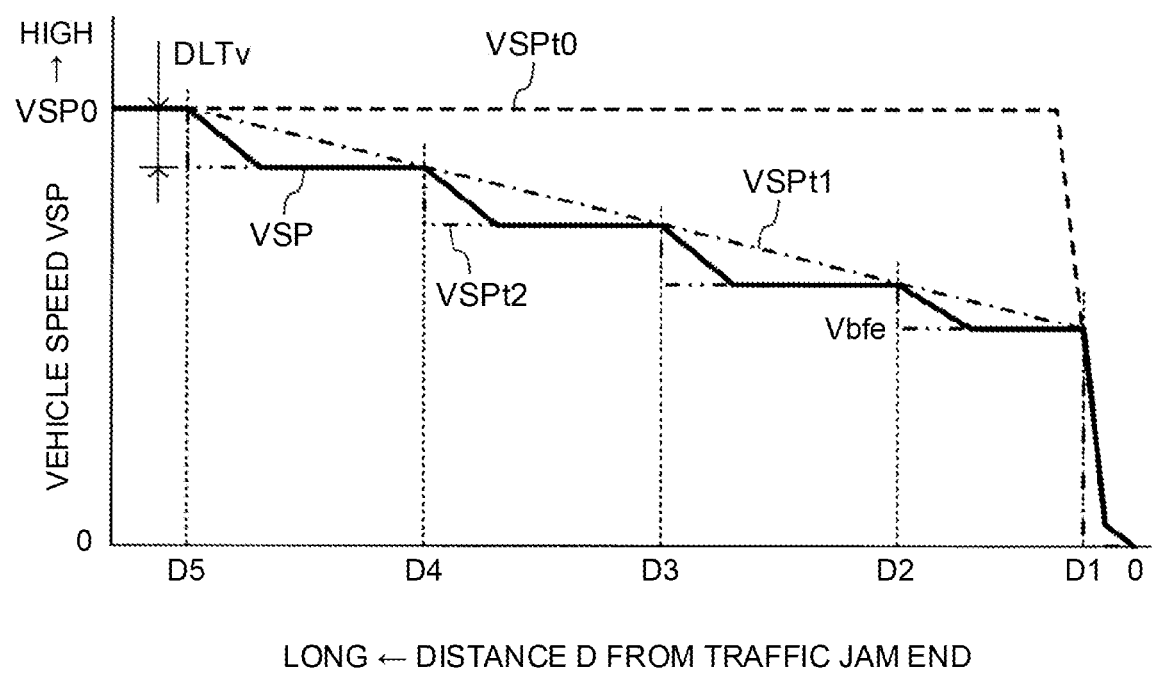
FIG. 3 is an explanatory view illustrating changes in a vehicle speed by a control in the embodiment.

FIG. 3 schematically illustrates changes in the vehicle speed VSP by the control (the control mode switching routine) in the present embodiment.

In FIG. 3, a dotted line indicates a case where the target vehicle speed VSPt0 for the automated driving in the normal time is maintained after a traffic jam is detected. Meanwhile, an alternate long and short dash line indicates a target vehicle speed VSPt1 when the vehicle speed VSP is continuously reduced toward the optimum fuel consumption vehicle speed Vbfe as a target speed for the automated driving at the time when a traffic jam is detected, and an alternate long and two short dashes line indicates a target vehicle speed VSPt2 when the vehicle speed VSP is reduced stepwise toward the optimum fuel consumption vehicle speed Vbfe similarly as the target speed at the time when a traffic jam is detected. The following assumes that, during travel at a vehicle speed VSP0 (=VSPt0), a traffic jam occurring on a travel route is detected at a position D5 on a near side to the host vehicle from the end (a position D=0) of the traffic jam.

As has been described earlier, in the normal time, a lower vehicle speed out of the speed limit and the setting vehicle speed is set as the target vehicle speed VSPt0. In the comparative example indicated by a dotted line, the target vehicle speed VSPt0 before detection of the traffic jam is maintained after the traffic jam is detected but before a vehicle positioned at the end of the traffic jam line is recognized. The vehicle speed is reduced as the vehicle-to-vehicle distance from the vehicle positioned at the end of the traffic jam line is reduced, and the vehicle stops at the position D=0 that is behind the vehicle positioned at the end of the traffic jam line only by a predetermined vehicle-to-vehicle distance.

On the other hand, in the present embodiment, as indicated by the alternate long and two short dashes line, the target vehicle speed VSPt2 is reduced by the predetermined speed DLTv per predetermined distance from the position D5 at which the traffic jam is detected (S105 in FIG. 2). A thick continuous line indicates the behavior of the vehicle of the present embodiment. As a result of the control performed such that the vehicle speed VSP approaches the target vehicle speed VSPt2, the vehicle alternately performs deceleration travel by fuel cut and constant-speed travel at the target vehicle speed VSPt2 after the reduction (that is, road-road travel).

When the vehicle-to-vehicle distance IVD from the leading vehicle is equal to or less than the predetermined distance IVDa, in other words, when the host vehicle is coming close to the traffic jam from the position D5 at which the traffic jam is detected and the host vehicle approaches the vehicle positioned at the end of the traffic jam line within a distance equal to or less than the predetermined distance IVDa, the vehicle is decelerated by fuel cut and an operation of the automatic wheel brake device 12 and stops at a position distanced from the leading vehicle by a predetermined vehicle-to-vehicle distance.

In the example illustrated in FIG. 3, the target vehicle speed VSPt2 is reduced to the optimum fuel consumption vehicle speed Vbfe, and a braking operation for stop is started at a position D1 after the vehicle speed VSP reaches the optimum fuel consumption vehicle speed Vbfe. However, when the vehicle-to-vehicle distance IVD has already reached the distance equal to or less than the predetermined distance IVDa even before the target vehicle speed VSPt reaches the optimum fuel consumption vehicle speed Vbfe, the vehicle performs fuel cut and then shifts to braking for stop.

Figure 4:
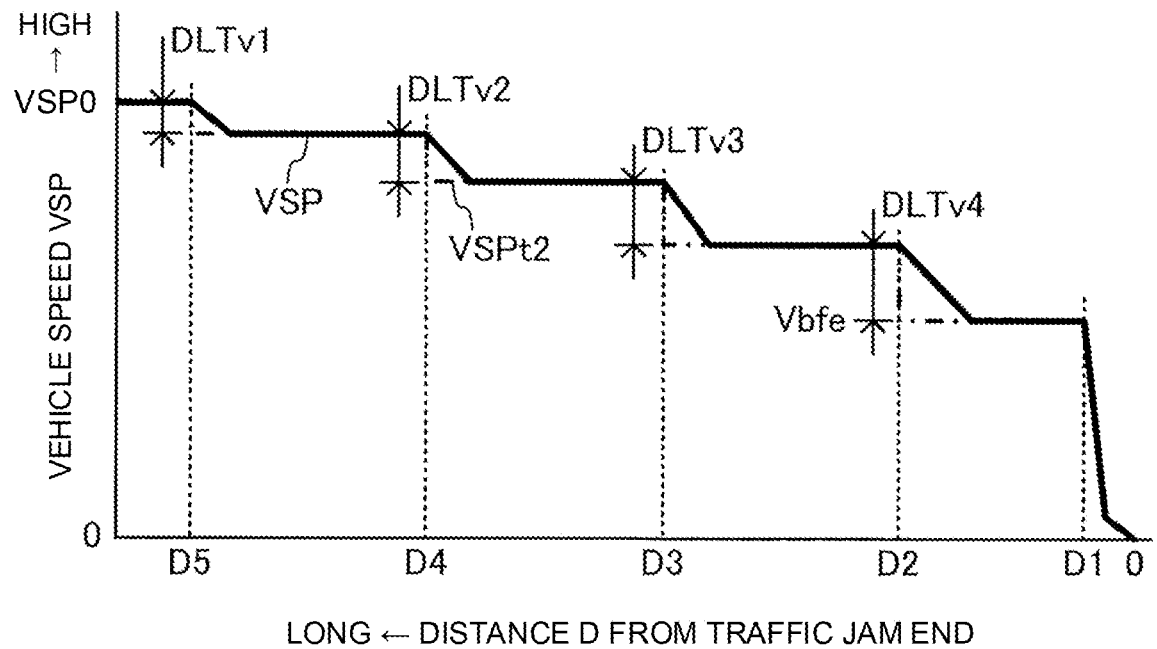
FIG. 4 is an explanatory view illustrating changes in a vehicle speed in another example of the control in the embodiment.
Figure 5:
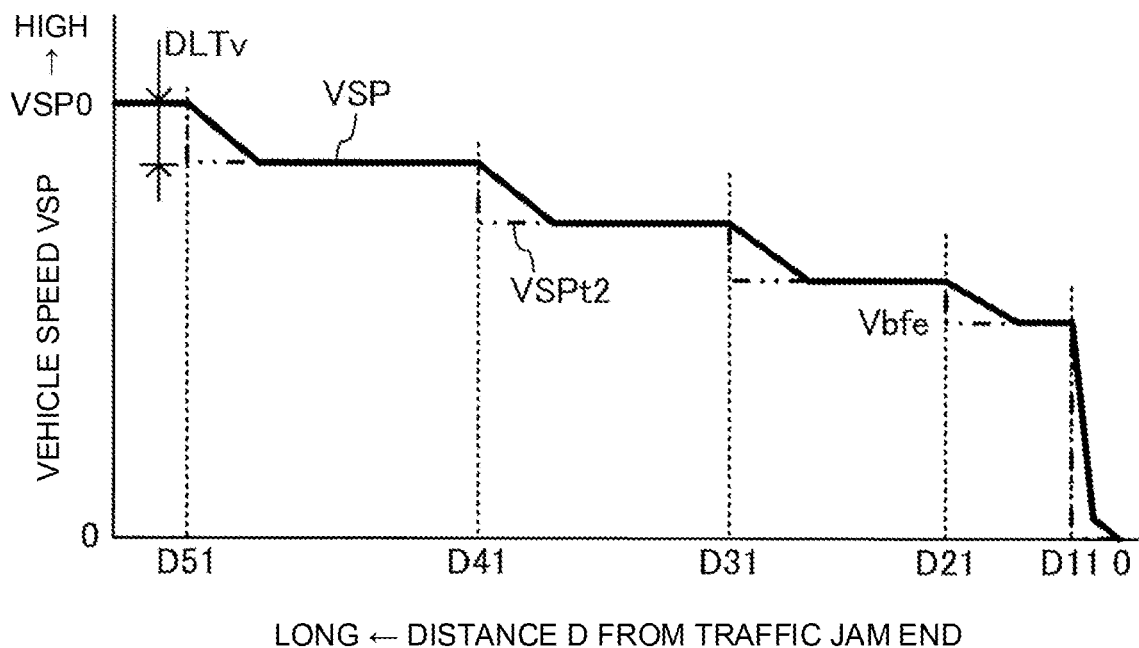
FIG. 5 is an explanatory view illustrating changes in a vehicle speed in further another example of the control in the embodiment.

As such, in the present embodiment, when the vehicle speed VSP is reduced due to detection of a traffic jam, the target vehicle speed VSPt2 is reduced by the predetermined speed DLTv per predetermined distance (e.g., D5–D4). However, the setting of the target vehicle speed VSPt2 when the vehicle speed VSP is reduced is not limited to this. For example, as indicated by the alternate long and short dash line in FIG. 3, the target vehicle speed VSPt1 can be reduced continuously. Further, the target vehicle speed VSPt2 is reduced per predetermined distance, but a vehicle speed difference DLTv before and after the reduction may be increased (DLTv1<DLTv2< . . . ) as the vehicle becomes closer to the traffic jam end. Further, the target vehicle speed VSPt2 is reduced by the predetermined speed DLTv, but the distance per which the target vehicle speed VSPt2 is reduced can be shortened as the vehicle is closer to the traffic jam end (D51−D41>D41−D31> . . . ). FIG. 4 schematically illustrates changes in the vehicle speed VSP in a first modification of the control in the present embodiment as the former example, and FIG. 5 schematically illustrates changes in the vehicle speed VSP in a second modification of the control in the present embodiment as the latter example.

The changes in the second modification (FIG. 5) can be achieved by adjusting the distance per which the target vehicle speed VSPt2 is reduced or can be achieved by reducing the target vehicle speed VSPt2 per predetermined time, in other words, by fixing a time interval per which the target vehicle speed VSPt2 is reduced.

Figure 6:
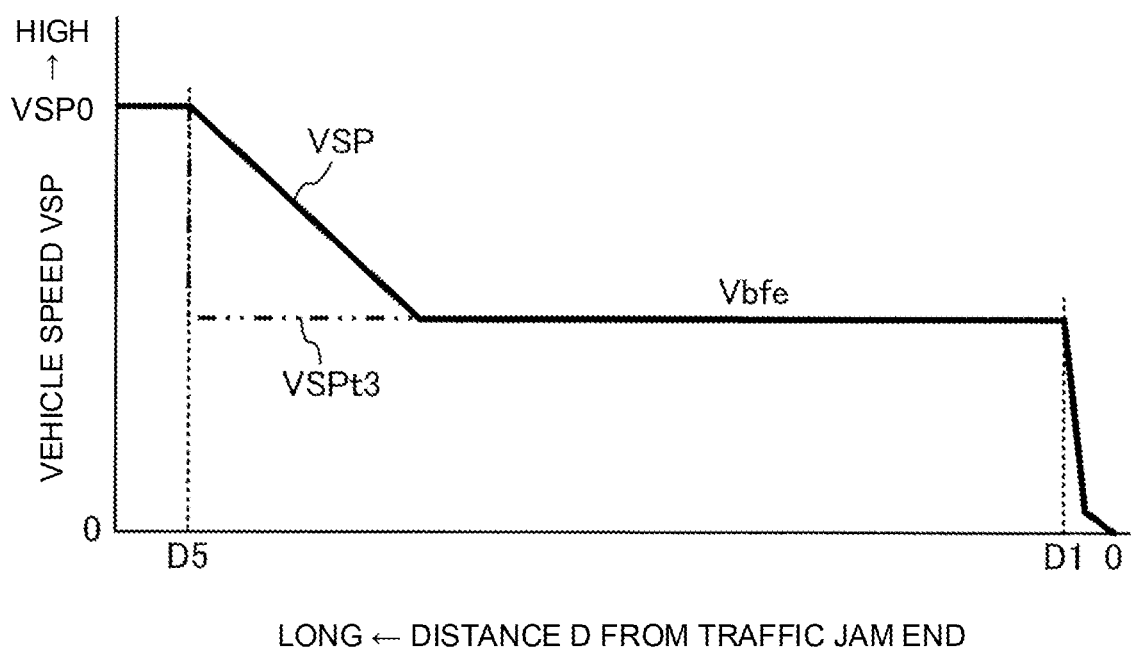
FIG. 6 is an explanatory view illustrating changes in a vehicle speed in further another example of the control in the embodiment.

Further, not only the target vehicle speed VSPt is gradually reduced along with extension of a travel distance or passage of time, but also the target vehicle speed VSPt may be reduced at a stretch to the optimum fuel consumption vehicle speed Vbfe after a traffic jam is detected. As an example of this case, FIG. 6 schematically illustrates changes in the vehicle speed VSP in a third modification of the control in the present embodiment. At a time point when a traffic jam is detected (the position D5), a target vehicle speed VSPt3 is reduced to the optimum fuel consumption vehicle speed Vbfe from the target vehicle speed VSPt0 before the detection of the traffic jam, and fuel cut is performed together with switching to the target vehicle speed VSPt3.

In the present embodiment, a "travel-state detection unit" is constituted by the vehicle speed sensor 19, a "driving controlling unit" is constituted by the driving support system controller 1, and a "traffic jam detection unit" is constituted by the road traffic information receiving device 18.

(Description of Operation-Effects)

An automatic control apparatus (the vehicle control system S) for the vehicle of the present embodiment is configured as described above, and effects obtained by the present embodiment will be summarized below.

First, when a traffic jam is detected, the vehicle speed VSP is reduced to be lower than the target vehicle speed VSPt0 for automated driving in the normal time, so that consumption of fuel that is required until the host vehicle reaches the traffic jam end is restrained, thereby making it possible to further improve fuel efficiency through the entire automated driving.

Further, due to the reduction in the vehicle speed VSP, the time required until the host vehicle reaches the traffic jam end can be extended. Here, when the traffic jam is eliminated before the host vehicle reaches the traffic jam end, it is possible to avoid traveling in a traffic jam in which the host vehicle travels at a low speed and acceleration and deceleration tend to be repeated frequently.

Secondly, since the predetermined distance DA (>DB) related to detection of a traffic jam is extended as a current vehicle speed VSP is higher, it is possible to secure, between a current position and the traffic jam end, an appropriate distance to obtain a fuel consumption reduction effect by reduction in the vehicle speed VSP.

In the present embodiment, this effect is embodied by changing the predetermined distances DA, DB in accordance with the attribute of a road where the vehicle is currently traveling, thereby making it possible to more surely obtain the fuel consumption reduction effect by reduction in the vehicle speed VSP. For example, by extending the predetermined distance DA (>DB) in an expressway where the vehicle tends to travel at a higher vehicle speed than in an ordinary road, it is possible to secure, between the current position and the traffic jam end, an appropriate distance to obtain the fuel consumption reduction effect.

Thirdly, since the vehicle speed VSP is gradually reduced from the current vehicle speed VSP (=VSP0) when the vehicle speed VSP is reduced, it is possible to obtain the fuel consumption reduction effect by reduction in the vehicle speed VSP while an influence of sudden deceleration on a following vehicle is avoided.

Fourthly, when the vehicle speed VSP is reduced, the vehicle speed VSP is reduced toward the optimum fuel consumption vehicle speed Vbfe, thereby making it possible to obtain a higher fuel consumption reduction effect.

Fifthly, since the reduction in the vehicle speed VSP is performed by stopping fuel supply to the engine E, it is possible to promote the fuel consumption reduction effect while the reduction in the vehicle speed VSP is surely achieved.

Description About Other Embodiments

In the above description, when the vehicle speed VSP is reduced, the target vehicle speed VSPt is reduced by the predetermined value DLTv. However, the speed difference DLTv by which the vehicle speed VSP is reduced can be changed in accordance with changes in a road traffic condition after a traffic jam is detected.

Figure 7:
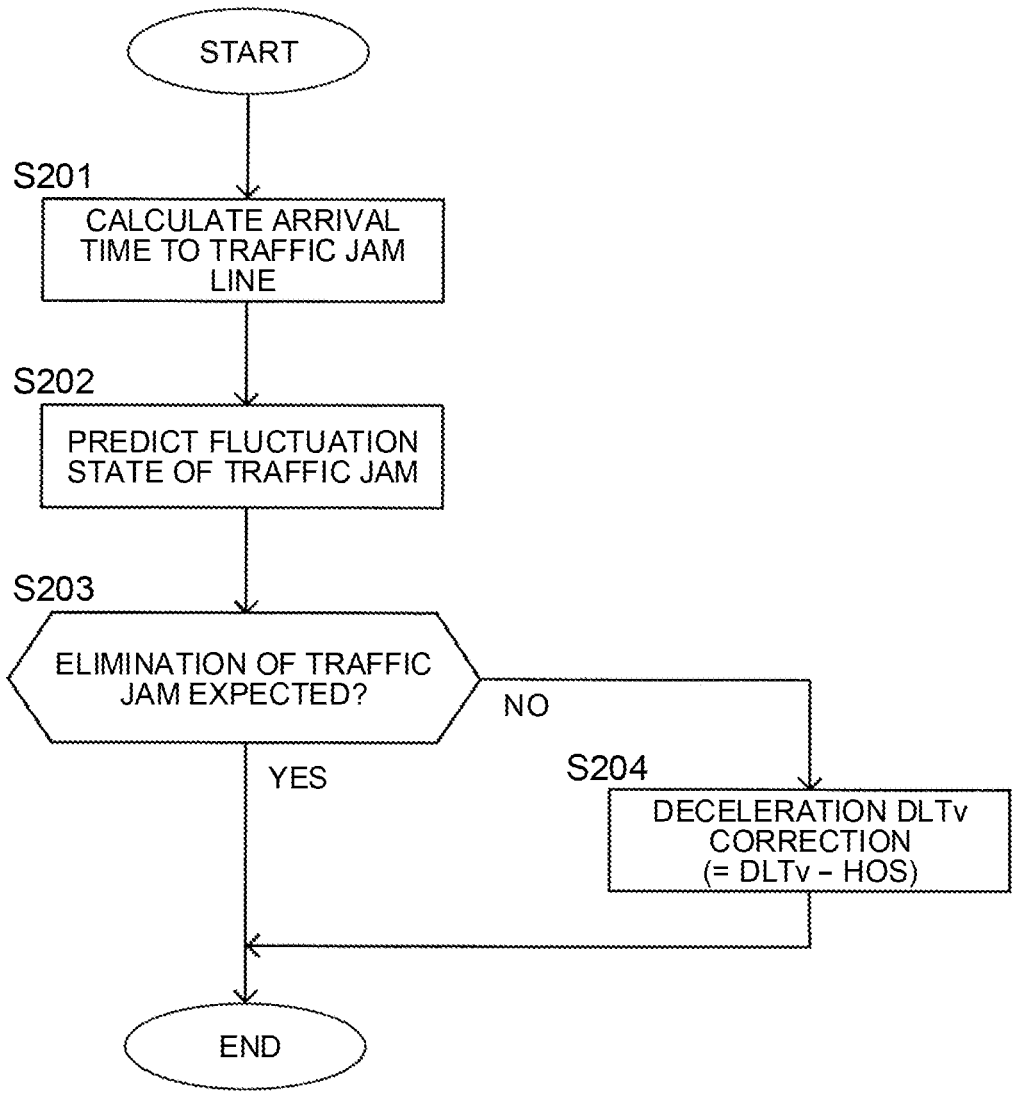
FIG. 7 is a flowchart illustrating details of a deceleration correction routine in a control in another embodiment of the present invention.

As an example of this case, FIG. 7 illustrates, by a flowchart, details of a deceleration correction routine in a control in another embodiment of the present invention.

The deceleration correction routine in the present embodiment performs the following process as the process of S105 in the flowchart illustrated in FIG. 2 in the control mode switching routine according to the previous embodiment. That is, in the present embodiment, the deceleration correction routine is provided as a subroutine of the control mode switching routine. A basic procedure of the control mode switching routine is similar to that in the previous embodiment.

In S201, an arrival time at a traffic jam line, in other words, a time to reach a traffic jam end is calculated.

In S202, a fluctuation state of a traffic jam is predicted as a road traffic condition after detection of the traffic jam.

In S203, whether or not the traffic jam is expected to be eliminated by the arrival time at the traffic jam line is determined. Whether the traffic jam is eliminated or not can be predicted based on the arrival time at the traffic jam line, the length of the traffic jam line, an average speed of vehicles forming the traffic jam line, the number of vehicles to newly join the traffic jam line, the number of vehicles to leave the traffic jam line, and so on. When the traffic jam is expected to be eliminated, the process of this routine is ended to return to the control mode switching routine, and when the traffic jam is not expected to be eliminated, the routine proceeds to S204.

In S204, the speed difference DLTv at the time when the vehicle speed VSP is reduced is updated to a value (=DLTv+HOS) increased only by a predetermined value HOS. Here, in consideration of an influence of deceleration on a following vehicle, a limit to the speed difference DLTv after the update may be set. For example, only in a case where the value (=DLTv+HOS) obtained by adding the predetermined value HOS is equal to or less than an upper limit LMT, the speed difference DLTv is updated by the value after the addition. Meanwhile, in a case where the value obtained by adding the predetermined value HOS exceeds the upper limit LMT, the upper limit LMT is set as the speed difference DLTv after the update.

$$DLTv=DLTv+HOS \qquad (2)$$

Figure 8:
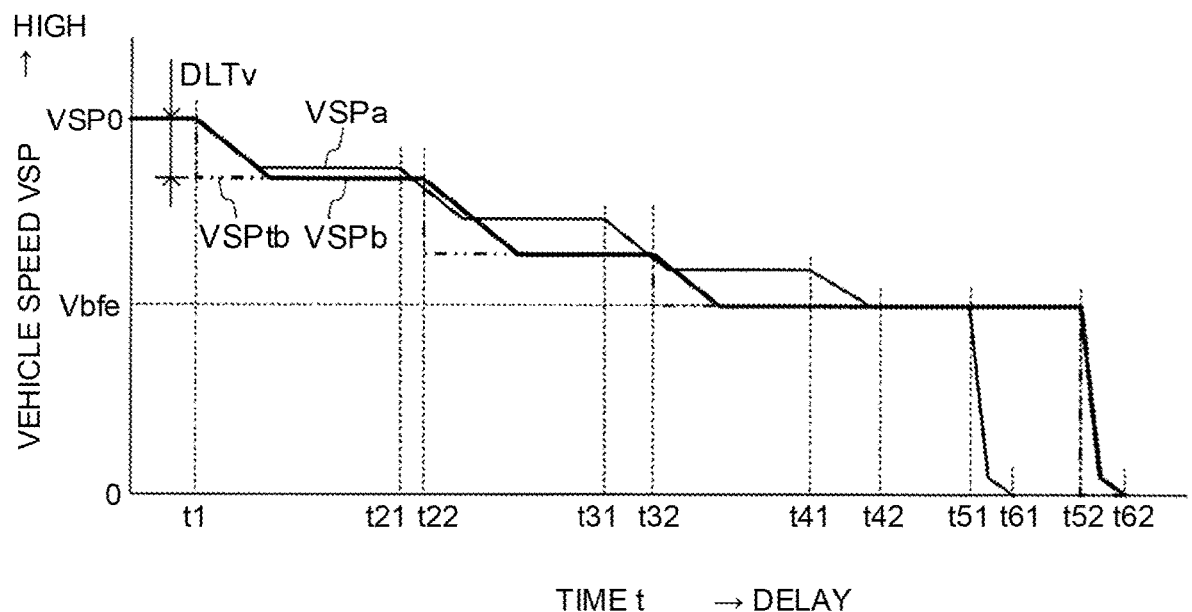
FIG. 8 is an explanatory view illustrating changes in a vehicle speed by the control in the embodiment in comparison with the control in the previous embodiment.

FIG. 8 schematically illustrates changes in the vehicle speed VSP by the control in the present embodiment in comparison with a case of the control in the previous embodiment.

In FIG. 8, the changes in the case of the control in the present embodiment are indicated by a thick continuous line (a vehicle speed VSPb), and the changes in the case of the control in the previous embodiment are indicated by a thin continuous line (a vehicle speed VSPa).

In the previous embodiment, at the time when the vehicle speed VSP is reduced, the target vehicle speed VSPt is reduced by the predetermined speed DLTv per predetermined distance. Hereby, when a vehicle positioned at the end of a traffic jam line is recognized at time t51 during travel at the optimum fuel consumption vehicle speed Vbfe after the target vehicle speed VSPt is reduced at times t1, t21, t31, and t41, the host vehicle starts deceleration for stop, and at time t61, the host vehicle stops at a position distanced from the vehicle positioned at the end of the traffic jam line only by a predetermined vehicle-to-vehicle distance.

On the other hand, in the present embodiment, at the time when the vehicle speed VSP is reduced, whether or not the traffic jam is expected to be eliminated before the host vehicle reaches the traffic jam end is determined. Depending on the predetermined speed difference DLTv, when the traffic jam is not expected to be eliminated, the speed difference DLTv is updated to a value increased only by the predetermined value HOS, and the target vehicle speed VSPt (=VSPtb) is reduced only by the speed difference DLTv after the update. Hereby, as the number of times of updates increases, times t22, t32 at which the vehicle speed VSP is reduced delay (in other words, a time required to advance only by a predetermined distance becomes long), so that arrival at the traffic jam end delays. More specifically, the host vehicle recognizes the vehicle positioned at the end of the traffic jam line at time t52 and stops at time t62 coming after time t61.

As such, in the present embodiment, in addition to the effect obtained by the previous embodiment, it is also possible to promote elimination of a traffic jam before the host vehicle reaches the traffic jam end, through adjustment of the time required until the host vehicle reaches the traffic jam end, by predicting a fluctuation state of the traffic jam and changing the speed difference DLTv, in other words, the deceleration at the time when the vehicle speed VSP is reduced in accordance with a result of the prediction.

The embodiments of the present invention have been described above, but the embodiments just show some applications of the present invention and are not intended to limit the technical scope of the present invention to the concrete configurations of the embodiments. The above embodiments can be variously altered or modified within the scope of what is described in Claims.

The invention claimed is:

1. An automated driving method for a vehicle, the automated driving method being for controlling the vehicle including an internal combustion engine as a drive source, the automated driving method comprising:
   while operating the vehicle in an automated driving mode with a first vehicle speed as a target vehicle speed of the vehicle, determining whether or not a traffic jam end is detected ahead of the vehicle by a distance equal to or more than a first predetermined distance on a travel route of the vehicle;
   upon determining that the traffic jam end is detected ahead of the vehicle by the distance equal to or more than a first predetermined distance:
   operating the vehicle in the automated driving mode with a second vehicle speed, lower than the first vehicle speed, as the target vehicle speed of the vehicle;
   determining whether the second vehicle speed is higher than an optimum fuel consumption vehicle speed at which a fuel consumption amount per travel distance is minimized,
   upon determining that the second vehicle speed is higher than the optimum fuel consumption vehicle speed, operating the vehicle in the automated driving mode with a third vehicle speed, lower than the second vehicle speed, as the target vehicle speed of the vehicle,
   upon determining that the second vehicle speed is lower than or equal to the optimum fuel consumption vehicle speed, operating the vehicle in the automated driving mode with the optimum fuel consumption vehicle speed as the target vehicle speed; and
   while operating the vehicle in the automated driving mode with the optimum fuel consumption vehicle speed as the target vehicle speed, upon determining that the traffic jam end is detected ahead of the host vehicle by a distance equal to or less than a second predetermined distance, which is less than the first predetermined distance, stopping fuel supply to the internal combustion engine.

2. The automated driving method for the vehicle, according to claim 1, wherein:
   the first predetermined distance is a distance longer than a vehicle-to-vehicle distance from a leading vehicle ahead of the vehicle, the vehicle-to-vehicle distance being set in a following travel time when the vehicle travels to follow the leading vehicle.

3. The automated driving method for the vehicle, according to claim 1, wherein:
   the first predetermined distance is a distance longer than a detectable distance by an in-vehicle sensor provided to recognize a leading vehicle ahead of the vehicle.

4. The automated driving method for the vehicle, according to claim 1, wherein:
   the first predetermined distance is set to be directly proportional to the first vehicle speed.

5. The automated driving method for the vehicle, according to claim 1, further comprising:
   changing the first predetermined distance in accordance with an attribute of a road on the travel route.

6. The automated driving method for the vehicle, according to claim 1, wherein the step of operating the vehicle in the automated driving mode with a second vehicle speed, lower than the first vehicle speed, as the target vehicle speed of the vehicle further comprises:
   causing a reduction from the first vehicle speed to the second vehicle speed at a constant rate.

7. The automated driving method for the vehicle, according to claim 1, further comprising:
   upon determining that the traffic jam end is detected ahead of the vehicle by the distance equal to or more than a first predetermined distance, decelerating toward the target vehicle speed by stopping fuel supply to the internal combustion engine.

8. The automated driving method for the vehicle, according to claim 1, comprising:
   detecting the traffic jam based on VICS information, vehicle-to-vehicle communication information, road-to-vehicle communication information, or road traffic information from a portable terminal.

9. The automated driving method for the vehicle, according to claim 1, comprising:
predicting a fluctuation state of the traffic jam; and
changing a deceleration when the target vehicle speed is reduced, the deceleration being changed in accordance with a prediction result of the fluctuation state.

10. An automatic control apparatus for a vehicle, the automatic control apparatus comprising a controller comprising a processor and a memory, wherein the memory contains instructions that, when executed by the processor, cause the processor to perform steps comprising:
while operating the vehicle in an automated driving mode with a first vehicle speed as a target vehicle speed of the vehicle, determining whether or not a traffic jam end is detected ahead of the vehicle by a distance equal to or more than a first predetermined distance on a travel route of the vehicle;
upon determining that the traffic jam end is detected ahead of the vehicle by the distance equal to or more than a first predetermined distance:
operating the vehicle in the automated driving mode with a second vehicle speed, lower than the first vehicle speed, as the target vehicle speed of the vehicle;
determining whether the second vehicle speed is higher than an optimum fuel consumption vehicle speed at which a fuel consumption amount per travel distance is minimized,
upon determining that the second vehicle speed is higher than the optimum fuel consumption vehicle speed, operating the vehicle in the automated driving mode with a third vehicle speed, lower than the second vehicle speed, as the target vehicle speed of the vehicle,
upon determining that the second vehicle speed is lower than or equal to the optimum fuel consumption vehicle speed, operating the vehicle in the automated driving mode with the optimum fuel consumption vehicle speed as the target vehicle speed; and
while operating the vehicle in the automated driving mode with the optimum fuel consumption vehicle speed as the target vehicle speed, upon determining that the traffic jam end is detected ahead of the host vehicle by a distance equal to or less than a second predetermined distance, which is less than the first predetermined distance, stopping fuel supply to the internal combustion engine.

* * * * *